United States Patent
Yun et al.

(10) Patent No.: US 11,984,616 B2
(45) Date of Patent: May 14, 2024

(54) LITHIUM SECONDARY BATTERY

(71) Applicant: LG CHEM, LTD., Seoul (KR)

(72) Inventors: Hyunwoong Yun, Daejeon (KR);
Youngdeok Kim, Daejeon (KR);
Hoejin Hah, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 762 days.

(21) Appl. No.: 17/258,324

(22) PCT Filed: May 11, 2020

(86) PCT No.: PCT/KR2020/006158
§ 371 (c)(1),
(2) Date: Jan. 6, 2021

(87) PCT Pub. No.: WO2020/231121
PCT Pub. Date: Nov. 19, 2020

(65) Prior Publication Data
US 2021/0273292 A1    Sep. 2, 2021

(30) Foreign Application Priority Data

May 14, 2019    (KR) .................. 10-2019-0056447
May 8, 2020     (KR) .................. 10-2020-0055448

(51) Int. Cl.
| | |
|---|---|
| *H01M 50/417* | (2021.01) |
| *H01M 4/02* | (2006.01) |
| *H01M 4/505* | (2010.01) |
| *H01M 4/525* | (2010.01) |
| *H01M 10/0525* | (2010.01) |
| *H01M 10/0568* | (2010.01) |
| *H01M 10/0569* | (2010.01) |

(52) U.S. Cl.
CPC ......... *H01M 50/417* (2021.01); *H01M 4/505* (2013.01); *H01M 4/525* (2013.01); *H01M 10/0525* (2013.01); *H01M 10/0568* (2013.01); *H01M 10/0569* (2013.01); *H01M 2004/028* (2013.01); *H01M 2300/0037* (2013.01)

(58) Field of Classification Search
CPC .... H01M 50/417; H01M 4/505; H01M 4/525; H01M 10/0569; H01M 10/0568
See application file for complete search history.

(56) References Cited

U.S. PATENT DOCUMENTS

| | | |
|---|---|---|
| 6,579,648 B2 | 6/2003 | Nakamizo et al. |
| 9,711,798 B2 | 7/2017 | Son et al. |
| 2011/0003210 A1 | 1/2011 | Lim et al. |
| 2016/0204476 A1 | 7/2016 | Kobayashi |
| 2016/0233549 A1 | 8/2016 | Tiruvannamalai et al. |
| 2017/0062829 A1 | 3/2017 | Ryu et al. |
| 2017/0324097 A1 | 11/2017 | Lee et al. |
| 2020/0235385 A1 | 7/2020 | Kim |

FOREIGN PATENT DOCUMENTS

| | | |
|---|---|---|
| CN | 108486699 A | 3/2017 |
| CN | 197359309 A | 11/2017 |
| EP | 3136475 A1 | 3/2017 |
| JP | 8-250099 A | 9/1996 |
| JP | 2001-15165 A | 1/2001 |
| JP | 2001-68088 A | 3/2001 |
| JP | 2001-176482 A | 6/2001 |
| JP | 2009-146756 A | 7/2009 |
| JP | 5186737 B2 | 4/2013 |
| KR | 1999-0074161 A | 10/1999 |
| KR | 10-0544495 B1 | 1/2006 |
| KR | 10-2011-0003131 A | 1/2011 |
| KR | 10-2014-0082378 A | 7/2014 |
| KR | 10-2015-0030156 A | 3/2015 |
| KR | 10-2015-0073615 A | 7/2015 |
| KR | 10-2017-0117467 A | 10/2017 |
| KR | 10-2018-0036564 A | 4/2018 |
| KR | 10-2018-0047085 A | 5/2018 |
| KR | 10-2019-0001215 A | 1/2019 |
| WO | 2015/030230 A1 | 3/2015 |

OTHER PUBLICATIONS

English translation of KR20110003131A obtained via Google Patents Nov. 16, 2023 (Year: 2012).*
Extended European Search Report for European Application No. 20804982.5, dated Aug. 27, 2021.
International Search Report for PCT/KR2020/006158 mailed on Sep. 1, 2020.

* cited by examiner

*Primary Examiner* — Sarah A. Slifka
(74) *Attorney, Agent, or Firm* — Birch, Stewart, Kolasch & Birch, LLP

(57) ABSTRACT

A lithium secondary battery exhibiting excellent life characteristic and stability is discussed, in which side reactions of an electrolyte are minimized, and non-uniform growth of lithium dendrite is effectively inhibited.

13 Claims, 1 Drawing Sheet

Comparative Example 2:Boron Nitride/PVDF protection layer
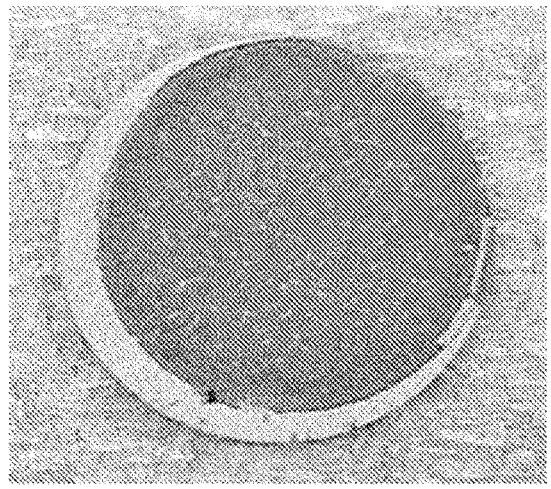
Example 1:Porous PO film protection layer
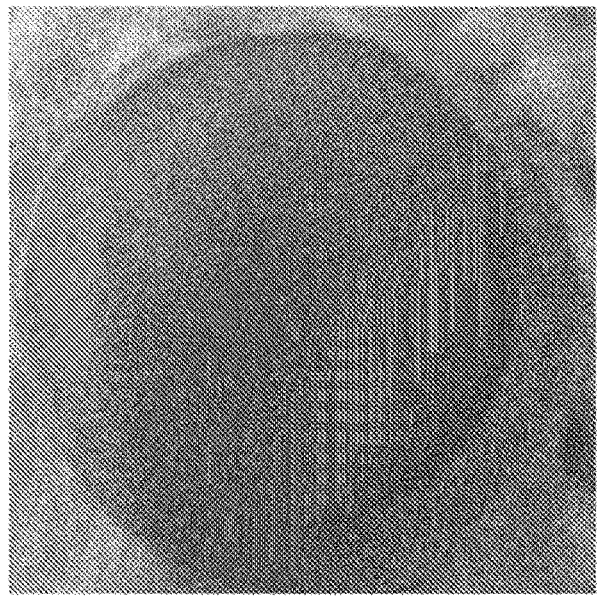

LITHIUM SECONDARY BATTERY

CROSS-REFERENCE TO RELATED APPLICATION

This application claims the benefit of Korean Patent Application No. 10-2019-0056447 filed on May 14, 2019 and Korean Patent Application No. 10-2020-0055448 filed on May 8, 2020 with the Korean Intellectual Property Office, the disclosures of which are herein incorporated by reference in their entirety.

TECHNICAL FIELD

The invention relates to a lithium secondary battery having improved life characteristic.

BACKGROUND ART

With rapid development of electric, electronic, communication and computer industries, there is an increasing demand for high capacity batteries. In order to meet such a demand, a lithium metal secondary battery using lithium metal or lithium alloy as an anode, having high energy density is receiving attentions.

The lithium metal secondary battery is a secondary battery using lithium metal or lithium alloy as an anode. Lithium metal has low density of 0.54 g/cm 3 and very low standard reduction potential of −3.045 V (based on SHE: standard hydrogen electrode), and thus, is receiving the most attention as electrode material of high energy density battery.

In the case of such a lithium metal secondary battery, unlike the existing lithium ion secondary battery, lithium metal is plated on an anode and charged, and stripped and discharged, wherein lithium dendrite may grow in the anode. If lithium dendrite is non-uniformly grow on the surface of an anode, a separator interposed between a cathode and an anode may be damaged and internal short circuit may be generated, which may lead to ignition. Thus, a technology for preventing the growth of lithium dendrite should be necessarily secured

DISCLOSURE

Technical Problem

It is an object of the invention to provide a lithium secondary battery that can prevent degradation of life characteristic and cell short circuit due to the growth of lithium dendrite, in which side reactions of an electrolyte are minimized.

Technical Solution

In order to achieve the object, there is provided a lithium secondary battery comprising a cathode, an anode, a separator interposed between the cathode and anode, and an electrolyte, wherein the anode comprises a current collector, a protection layer, and optionally, a lithium metal layer interposed between the current collector and protection layer, wherein the protection layer comprises a hydrophilically surface modified porous polyolefin film, wherein the protection layer has a contact angle to an electrolyte prepared by dissolving LiFSI in a solvent mixture of polycarbonate and dimethylcarbonate in a volume ratio of 3:7 at the concentration of 3.5 M, of 40° or less, wherein the electrolyte comprises an organic solvent and lithium salts, and wherein the lithium salt are present at a concentration range of 2 M to 7 M.

The protection layer may be hydrophilically surface modified by plasma treatment.

The porous polyolefin may be a polymer of olefinic monomers, or a copolymer of olefinic monomers and polar monomers.

Wherein, the olefinic monomers may be one or more selected from the group consisting of ethylene, propylene, 1-butene, 1,3-butadiene, 1-pentene, 4-methyl-1-pentene, 1-hexene, 1-heptene, 1-octene, 1-decene, 1-dodecene, 1-tetradecene, 1-hexadecene, 1-octadecene, and 1-eicosene.

And, the polar monomers may be one or more selected from the group consisting of unsaturated carboxylic acid and derivatives of unsaturated carboxylic acid; styrene derivatives; (meth)acrylamide and derivatives of (meth)acrylamide; acrylonitrile and derivatives of acrylonitrile; and C1-6 alkylvinylketone.

Preferably, the polar monomers may be one or more selected from the group consisting of (meth)acrylic acid, vinyl acetate, methyl(meth)acrylate, ethyl(meth)acrylate, butyl(meth)acrylate, styrene, alpha-methylstyrene, acrylonitrile, and methylvinylketone.

The air permeability of the porous polyolefin film may be 300 sec/100 cc or less.

The thickness of the protection layer may be 1 μm to 30 μm.

The pore size of the protection layer may be 10 nm to 1000 nm, and the porosity may be 20% to 80%.

In the electrolyte, the organic solvent may be a carbonate-based solvent, an ether-based solvent, a phosphate-based solvent, or a combination thereof. Specifically, the carbonate-based solvent may be one or more selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC), and the ether-based solvent may be one or more selected from the group consisting of dibutyl ether, tetraglyme, diglyme, dimethoxyethane, 2-methyltetrahydrofurane, and tetrahydrofuran.

In the electrolyte, the lithium salt may be $LiPF_6$, $LiBF_4$, $LiSbF_6$, $LiAsF_6$, $LiC_4F_9SO_3$, $LiClO_4$, $LiAlO_2$, $LiAlCl_4$, $LiN(C)<F_{2x+1}SO_2)(C_yF_{2y+1}SO_2)$(wherein, x and y are natural numbers), LiCl, LiI, $LiB(C_2O_4)_2$, lithium bis(fluorosulfonyl)imide, lithium bis(trifluoromethanesulfonyl)imide, lithium bis(perfluoroethylsulfonyl)imide, lithium (fluorosulfonyl)(nonafluorobutanesulfonyl)imide, lithium (fluorosulfonyl)(trifluoromethanesulfonyl)imide, or a combination thereof.

The cathode may comprise one or more cathode active material selected from the group consisting of lithium-manganese oxide, lithium-cobalt oxide, lithium-nickel oxide, lithium-nickel-manganese oxide, lithium-nickel-cobalt oxide, lithium-manganese-cobalt oxide, and lithium-nickel-manganese-cobalt oxide.

According to one embodiment, the cathode may comprise a nickel-cobalt-manganese cathode active material.

Effect of the Invention

The lithium secondary battery of the invention exhibits excellent life characteristic and stability, because side reactions of an electrolyte are minimized, and non-uniform growth of lithium dendrite is effectively inhibited.

BRIEF DESCRIPTION OF DRAWINGS

The FIGURE shows the photographs of the surfaces of anode protection layers after charging the batteries of Comparative Example 2 and Example 1 one time, and then, decomposing them.

BEST MODE

Mode for Invention

The terms used herein are only to explain specific embodiments, and are not intended to limit the invention. A singular expression includes a plural expression thereof, unless it is expressly stated or obvious from the context that such is not intended. As used herein, the terms "comprise" or "have", etc. are intended to designate the existence of practiced characteristic, step, constructional element or combinations thereof, and they are not intended to preclude the possibility of existence or addition of one or more other characteristics, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, the invention will be explained in detail.

According to one embodiment of the invention, there is provided a lithium secondary battery comprising a cathode, an anode, a separator interposed between the cathode and anode, and an electrolyte,
  wherein the anode comprises a current collector, a hydrophilically surface modified porous polyolefin film protection layer, and optionally, a lithium metal layer interposed between the current collector and protection layer,
  the porous polyolefin film protection layer has a contact angle to an electrolyte prepared by dissolving LiFSI in a solvent mixture of polycarbonate and dimethylcarbonate of a volume ratio of 3:7 at the concentration of 3.5 M, of 40° or less, and
  the electrolyte comprises an organic solvent and lithium salts, and comprises the lithium salt at the concentration of 2 M to 7 M.

In order to improve stability and life characteristic of a lithium metal secondary battery using lithium metal as anode active material, a hydrophilically surface modified porous polyolefin film protection layer is included in an anode. The protection layer has a uniform nanosized pore structure, thus inducing uniform growth of lithium dendrite during charge/discharge of a battery, and is hydrophilic and has excellent wettability, thus exhibiting high compatibility (affinity) with high concentration electrolyte. Thus, the lithium secondary battery comprising an anode to which the protection layer is applied may exhibit excellent battery performance, because short circuit of a battery due to non-uniform growth of lithium dendrite and degradation of life characteristic due to side reactions of an electrolyte are improved.

The anode comprises a current collector, a porous polyolefin film protection layer, and optionally, a lithium metal layer interposed between the current collector and protection layer, The current collector is not specifically limited as long as it does not induce chemical change in a battery and has conductivity, and for example, copper, stainless steel, aluminum, nickel, titanium, baked carbon, copper or stainless steel surface treated with carbon, nickel, titanium, silver, and the like, aluminum-cadmium alloy, and the like may be used. And, it may have various shapes such as a film with/without fine unevenness on the surface, a sheet, a foil, a net, porous material, foaming body, non-woven fabric, and the like.

The thickness of the current collector is not specifically limited, but it may be preferably 3 to 30 μm, more preferably 10 to 20 μm. If the thickness of the current collector is greater than 30 μm, capacity per volume of an electrode may decrease, and if it is less than 3 μm, folding may be generated during the manufacture of an electrode.

The electrode active material layer is optionally included. Namely, the electrode of the invention may comprise a current collector and a protection layer without an electrode active material layer, or may comprise a current collector, an electrode active material layer, and a protection layer. Wherein, the electrode active material layer may be interposed between the current collector and protection layer, and the electrode may have a structure wherein a current collector, an electrode active material layer, and a protection layer are sequentially stacked. In the case of an electrode without an electrode active material layer, lithium metal is plated between the current collector and protection layer during charge/discharge after battery assembly, and thus, an electrode active material may be produced during the use of a battery.

The electrode active material layer comprises lithium metal as active material, and may further comprise one or more selected from the group consisting of lithium alloy, lithium metal complex oxide, lithium-containing titanium complex oxide (LTO), and combinations thereof. Wherein, the lithium alloy comprises elements that can be alloyed with lithium, and as the elements that can be alloyed with lithium, Si, Sn, C, Pt, Ir, Ni, Cu, Ti, Na, K, Rb, Cs, Fr, Be, Mg, Ca, Sr, Sb, Pb, In, Zn, Ba, Ra, Ge, Al or combinations thereof may be mentioned.

Preferably, the electrode active material layer may be lithium metal or lithium alloy, more preferably lithium metal.

The thickness of the electrode active material layer may be 0 to 40 μm, preferably 5 to 40 μm, more preferably 5 to 20 μm.

A method for forming an electrode active material layer on the current collector is not specifically limited, and methods known in the art may be used. For example, the electrode active material layer may be formed by depositing or coating lithium metal or lithium alloy on the current collector by dry or wet process, or by laminating already prepared lithium metal sheet or foil on the current collector.

The porous polyolefin used as the anode protection layer may be a polymer of olefinic monomers, or a copolymer of olefinic monomers and polar monomers As specific examples of the olefinic monomers, one or more selected from the group consisting of ethylene, propylene, 1-butene, 1,3-butadiene, 1-pentene, 4-methyl-1-pentene, 1-hexene, 1-heptene, 1-octene, 1-decene, 1-dodecene, 1-tetradecene, 1-hexadecene, 1-octadecene, and 1-eicosene may be mentioned.

The polar monomers are compounds having large dipole moment compared to olefinic monomers, and mean olefin having one or more polar functional groups. Since a porous polyolefin film prepared using such polar monomers as comonomers has high hydrophilicity, it may exhibit excellent affinity with an electrolyte in which high concentration of lithium salts are dissolved, thus reducing battery resistance and improving output property.

As the polar monomers, unsaturated carboxylic acid and derivatives thereof such as vinyl acetate, (meth)acrylic acid, methyl (meth)acrylate, ethyl (meth)acrylate, butyl (meth)acrylate, and the like; styrene and styrene derivatives such as α-methyl styrene; (meth)acrylamide such as acrylamide, methacrylamide, and derivatives thereof; acrylonitrile and derivatives thereof; C1-6 alkyl vinyl ketone such as methyl vinyl ketone, and the like, may be mentioned, and they may be used in combinations. Wherein, the "(meth)acrylic acid" is used to mean acrylic acid and methacrylic acid, "(meth)acrylate" is used to mean acrylate and methacrylate, and "(meth)acrylamide" is used to mean acrylamide and methacrylamide.

More specifically, the polar monomers may be one or more selected from the group consisting of (meth)acrylic acid, vinyl acetate, methyl(meth)acrylate, ethyl(meth)acrylate, butyl(meth)acrylate, styrene, alpha-methylstyrene, acrylonitrile, and methylvinylketone.

According to one embodiment, the porous polyolefin film may be polyethylene(PE), polypropylene(PP), copolymer of ethylene and vinyl acetate (ethylene-vinyl acetate, EVA), copolymer of ethylene and acrylic acid (ethylene acrylic acid, EAA), or copolymer ethylene and ethyl acrylate (ethylene ethylacrylate, EEA), but is not limited thereto.

Commonly, since the polyolefin film is a polymer of olefinic monomers and exhibits hydrophobicity, when an electrolyte containing a high concentration of lithium salts is used, wettability is lowered, and thus, desired electrochemical properties cannot be realized. Thus, by hydrophilic surface modification of the porous polyolefin film protection layer by plasma treatment, affinity with high concentration electrolyte is improved. As explained above, although polyolefin prepared using polar monomers together exhibits improved hydrophilicity compared to polyolefin prepared using only olefinic monomers, it may have further improved hydrophilicity by plasma treatment.

The active gas for plasma treatment may be nitrogen, oxygen, air, argon, helium, carbon dioxide, carbon monoxide, ozone, silane, alkane, fluoroalkane, and the like, and preferably, nitrogen, oxygen air, argon or a mixture thereof.

The plasma treatment may be conducted using radio frequency plasma, cyclotron resonance frequency plasma or microwave plasma, or corona discharge, and specifically, corona discharge may be used. The corona discharge may be conducted without supplying inter gas as described above.

The corona discharge may be conducted under atmospheric pressure, using plasma output of 1 to 10 kW, more preferably 100 to 3000 W, most preferably 100 to 500 W.

During the plasma treatment, a distance (exposure distance) between a nozzle and a porous polyolefin film may be 0.1 to 300 mm, more preferably 1 to 200 mm, even more preferably 1 to 50 mm, most preferably 1 to 10 mm.

By the above explained plasma treatment, the surface of the porous polyolefin film protection layer is hydrophilically modified, thereby exhibiting excellent wettability even to a high concentration electrolyte having high viscosity.

The hydrophilically surface modified porous polyolefin film protection layer may have a contact angle to an electrolyte prepared by dissolving LiFSI in a solvent mixture of polycarbonate and dimethylcarbonate of a volume ratio of 3:7 at the concentration of 3.5 M, of 40° or less, 30° or less, or 20° or less. As the contact angle is closer to 0°, hydrophilicity is more excellent, and thus, there is no lower limit to the water contact angle, and it may be 0°. The contact angle may be measured by a sessile drop method wherein liquid drops of an electrolyte are dropped on the surface of a protection layer and left for 30 minutes, and then, a contact angle is measured using a microscope.

Since the porous polyolefin film protection layer has uniform nanosized pores, it enables lithium dendrite to uniformly grow on the surface of an electrode during charge/discharge of a battery. Thereby, damages to a protection layer and a separator, caused by non-uniform growth of lithium dendrite, and the resulting battery short circuit may be prevented, and thus, stability and life characteristic of a battery may be remarkably improved.

In order to secure the above effects, the pore size of the porous polyolefin film protection layer may be 10 to 1000 nm, or 10 to 100 nm, preferably 20 to 50 nm. If the pore size of the protection layer is less than 10 nm, resistance may increase in transferring lithium ions, and if it is greater than 1000 nm, elasticity of the porous polyolefin film protection layer may be lowered. Wherein, the pore size may be measured using commercially available pore size distribution measuring equipment, and for example, it may be measured by a $N_2$ adsorption method using BELSORP-miniX equipment of SOLETEX Company.

The air permeability of the porous polyolefin film protection layer may be 300 sec/100 cc or less, or 250 sec/100 cc or less, or 220 sec/100 cc or less, and 50 sec/100 cc or more, 100 sec/100 cc or more, or 120 sec/100 cc or more. If the air permeability of the protection layer exceeds 300 sec/100 cc, elasticity may be lowered, the causing problems in terms of mechanical properties, and if it is less than 50 sec/100 cc, resistance may increase. The air permeability may be measured using Gurley air permeability tester according to JIS P-8117, and the measurement method of air permeability will be explained in detail in the Examples below.

And, the porosity of the porous polyolefin film protection layer is preferably 20 to 80%, more preferably 30 to 70%, or 40 to 50%. The porosity is a numerical value calculated by measuring the true density, thickness and mass of the porous polyolefin film protection layer, and specifically, it may be derived from the following Equation.

$$\text{Porosity (\%)} = (1 - (\text{measured density of porous polyolefin film protection layer}/\text{theoretical density of polyolefin})) \times 100 \quad \text{[Equation 1]}$$

If the porosity of the protection layer is less than 20%, resistance may increase in transferring lithium ions, and if it exceeds 80%, mechanical properties of the protection layer such as elasticity may be degraded. Thus, it is preferable that the above range is fulfilled.

The thickness of the porous polyolefin film protection layer may be appropriately controlled according to the constructions of an electrode and a battery, and for example, it may be in the range of 1 to 30 μm, or 3 to 10 μm. Within the above thickness range, the growth of lithium dendrite, and non-uniform growth may be effectively inhibited.

Meanwhile, the electrolyte comprises an organic solvent and lithium salts, and it comprises lithium salts at the concentration of 2 M to 7 M, or 3 M to 5 M.

If the molar concentration of lithium salts of an electrolyte is high, battery life deterioration due to side reactions of an electrolyte may be minimized. Specifically, a free solvent that does not solvate lithium ions, existing in an electrolyte, preferentially causes side reactions during charge/discharge of a battery, and if high concentration electrolyte is used, the amount of the free solvent is reduced, thus decreasing side reactions of an electrolyte. Particularly, a lithium metal secondary battery using lithium metal as anode active material more seriously generates side reactions of an electrolyte during charge, which has the most adverse influence on battery life. However, by applying high concentration electrolyte, the above problem may be solved to remarkably improve battery life characteristic. Wherein, the high concentration electrolyte means an electrolyte having molar concentration of lithium salts of 2 M or more.

However, the molar concentration of lithium salts is greater than 7 M, the viscosity of an electrolyte may become too high, and the entire quantity of lithium salts may not be dissociated, and thus, it is preferable that the above range is fulfilled.

The organic solvent included in the electrolyte is non-aqueous organic solvent, and carbonate, ester, ether, ketone, alcohol, phosphate solvents and the like, commonly used in the art, may be used without limitations. According to one embodiment, as the organic solvent, a carbonate-based solvent, an ether-based solvent, a phosphate-based solvent, or combinations thereof may be used. In case a carbonate-based solvent and/or an ether-based solvent is used, it may properly dissociate lithium salts, and has low viscosity, and thus, has relatively excellent ion conductivity.

As the carbonate-based solvent, one or more selected from the group consisting of dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and fluoroethylene carbonate (FEC) may be used. According to one embodiment, as the carbonate-based solvent, a solvent mixture of DMC and PC of a volume ratio of 10:1 to 1:1, or 7:3 to 1:1 may be used, or a solvent mixture of EMC and FEC of a volume ratio of 10:1 to 7:3, or 9:1 to 7:3 may be used.

As the ether-based solvent, one or more selected from the group consisting of dimethyl ether (DME), diethyl ether (DEE), dibutyl ether (DBE), tetraglyme, diglyme, dimethoxyethane, 2-methyltetrahydrofurane, tetrahydrofuran, and 1,1,2,2-tetrafluoroethyl-2,2,3,3-tetrafluoropropyl ether (TTE) may be used. Among them, DME, DEE, TTE and the like may be more appropriately used.

In case the carbonate-based solvent and ether-based solvent are used in combination, the mixing ratio is not specifically limited, and it may be appropriately controlled according to the aimed battery performance. For example, a solvent mixture of DMC and TTE of a volume ratio of 10:1 to 1:1, or 7:3 to 1:2 may be used.

As the phosphate-based solvent, one or more selected from the group consisting of trimethylphosphate, triethylphosphate, triphenylphosphate, tricresylphosphate, cresyldiphenylphosphate, octyldiphenylphosphate, biphenyldiphenyl phosphate, trioctyl phosphate and tributyl phosphate may be used, but not limited thereto.

As the lithium salt used in the electrolyte, $LiPF_6$, $LiBF_4$, LiFSI, LiTFSI, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$(wherein, x and y are natural numbers), LiCl, LiI, $LiB(C_2O_4)_2$, lithium bis(oxalato) borate (LiBOB), lithium bis(fluorosulfonyl)imide (LiFSI), lithium bis(trifluoromethanesulfonyl)imide (LiTFSI), lithium bis(perfluoroethylsulfonyl)imide (LiBETI), lithiuim(fluorosulfonyl)(nonafluorobutanesulfonyl) imide (LiNFSI), lithium(fluorosulfonyl)(trifluoromethanesulfonyl)imide (LiFTI or LiFTA), or combinations thereof may be mentioned.

The electrolyte may further comprise additives commonly included in an electrolyte for a lithium secondary battery, in addition to the organic solvent and lithium salts. For example, the electrolyte may further comprise vinylene carbonate or ethylene carbonate compounds such as difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like, as additives, so as to improve battery life.

Meanwhile, the cathode comprises a cathode active material layer formed on a cathode current collector.

The cathode current collector is not specifically limited as long as it does not induce chemical change in a battery and has high conductivity, and for example, stainless steel, aluminum, nickel, titanium, baked carbon, or aluminum or stainless steel surface treated with carbon, nickel, titanium, silver, and the like, may be used. The current collector may have various forms such as a film, sheet, foil, net, porous body, foaming body, non-woven fabric, and the like. The thickness of the current collector may be in the range of 3~500 μm, but is not limited thereto.

The cathode active material layer may be prepared by applying cathode active material slurry prepared by mixing cathode active material, conductive agent and binder in the presence of an organic solvent on the current collector, drying and rolling.

As the cathode active material, compounds capable of reversible intercalation and deintercalation of lithium, known in the art, may be used without limitations. Specifically, the cathode active material may be lithium complex metal oxide comprising one or more metals such as cobalt, manganese, nickel, or aluminum, and lithium.

As the lithium complex metal oxide, lithium-manganese oxide (for example, $LiMnO_2$, $LiMn_2O_4$), lithium-cobalt oxide (for example, $LiCoO_2$), lithium-nickel oxide (for example, $LiNiO_2$), lithium-nickel-manganese oxide (for example, $LiNi_{1-Y}Mn_YO_2$ (wherein, $0<Y<1$), $LiMn_{2-Z}Ni_ZO_4$ (wherein, $0<Z<2$)), lithium-nickel-cobalt oxide (for example, $LiNi_{1-Y1}Co_{Y1}O_2$ (wherein, $0<Y1<1$)), lithium-manganese-cobalt oxide (for example, $LiCo_{1-Y2}Mn_{Y2}O_2$ (wherein, $0<Y2<1$), $LiMn_{2-Z1}Co_{Z1}O_4$ (wherein, $0<Z1<2$)), lithium-nickel-manganese-cobalt oxide (for example, $Li(Ni_pCo_qMn_{r1})O_2$ (wherein, $0<p<1$, $0<q<1$, $0<r1<1$, $p+q+r1=1$) or $Li(Ni_{p1}Co_{q1}Mn_{r2})O_4$ (wherein, $0<p1<2$, $0<q1<2$, $0<r2<2$, $p1+q1+r2=2$)), or lithium-nickel-cobalt-transition metal (M) oxide (for example, $Li(Ni_{p2}Co_{q2}Mn_{r3}Ms_2)O_2$ (wherein, M is one or more selected from the group consisting of Al, Fe, V, Cr, Ti, Ta, Mg and Mo, p2, q2, r3 and s2 are atomic fractions of each element, and $0<p2<1$, $0<q2<1$, $0<r3<1$, $0<s2<1$, $p2+q2+r3+s2=1$)), and the like, may be mentioned, and among them, one or compounds of two or more may be included.

Among them, the lithium metal complex oxide may be $LiCoO_2$, $LiMnO_2$, $LiNiO_2$, lithium nickel-manganese-cobalt oxide (for example, $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$), or lithium nickel-cobalt-aluminum oxide (for example, $Li(Ni_{0.8}Co_{0.15}Al_{0.05})O_2$), and the like, since they may increase battery capacity characteristic and stability.

According to one embodiment, the cathode active material may be lithium-nickel-manganese-cobalt oxide. The lithium-nickel-manganese-cobalt oxide also referred to as NCM active material has excellent economical efficiency since a part of expensive cobalt components are replaced with manganese, and simultaneously, has high capacity and stability, and thus, it may be preferably used. Specifically, the cathode active material may be $Li(Ni_{0.6}Mn_{0.2}Co_{0.2})O_2$, $Li(Ni_{0.5}Mn_{0.3}Co_{0.2})O_2$, or $Li(Ni_{0.8}Mn_{0.1}Co_{0.1})O_2$.

The conductive material is used to give conductivity to an electrode, any electronically conductive material may be used as long as it does not cause chemical change in a battery and is electronically conductive, and for example, carbonaceous material such as natural graphite, artificial graphite, carbon black, acetylene black, ketjen black, carbon fiber, and the like; metallic material such as metal powder such as copper, nickel, aluminum, silver, and the like, or metal fiber; conductive polymer such as polyphenylene derivatives; or a mixture thereof may be used.

The binder functions for properly attaching active material particles to each other, and properly attaching active material to a current collector, and as representative examples, polyvinyl alcohol, carboxymethylcellulose, hydroxypropylcellulose, polyvinyl chloride, carboxylated polyvinyl chloride, polyvinyl fluoride, ethylene oxide containing polymer, polyvinyl pyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be mentioned, but the binder is not limited thereto.

The separator separates an anode and a cathode and provides lithium ion transfer pathway, and those commonly used in a lithium battery may be used. Namely, those having low resistance to electrolyte ion transfer and excellent electrolyte wettability may be used. For example, it may be selected from glass fiber, polyester, Teflon, polyethylene, polypropylene, polytetrafluoroethylene(PTFE) or combinations thereof, and it may be in the form of non-woven fabric or woven fabric. For example, in a lithium ion battery, a polyolefin-based polymer separator such as polyethylene, polypropylene, and the like is mainly used, and a coated separator including a ceramic component or polymer material may be used so as to secure heat resistance or mechanical strength, and optionally, it may be used in a single layer or multilayer. According to one embodiment, a separator prepared by coating ceramic coating material containing ceramic particles and ionic binder polymer on both sides of a polyolefin-based polymer substrate may be used.

The lithium secondary battery of the invention may achieve high energy density using lithium metal as anode active material, and induce uniform growth of lithium dendrite by the porous polyolefin film protection layer formed on the anode, and thus, exhibits excellent stability and life characteristic. And, the lithium secondary battery of the invention may minimize side reactions of an electrolyte during charge/discharge of a battery, using an electrolyte containing a high concentration of lithium salts.

Hereinafter, preferable examples are presented for better understanding of the invention, but these examples are presented only as the illustrations of the invention, and it is obvious to one of ordinary knowledge in the art that various modifications and alterations can be made within the categories and technical ideas of the invention, and such modifications and alterations are within the range of attached claims.

Example

Preparation Example 1: Preparation of Porous Polypropylene(PP) Film

Polypropylene(PP) resin(Toray Industries, Inc.) was fed to a single screw extruder (discharge rate 10 kg/hour) and melt extruded at 230° C. Foreign matter was removed from the extruded PP resin using a leaf disc filter in which 5 pieces of sintered filters cut to 10 μm (filtration area: 65000 mm$^2$) were set, and then, the resin was passed through a wire mesh screen filter (filtration area: 20000 mm$^2$) cut to 30 μm. Thereafter, it was discharged from a T die to a cast drum of which surface temperature was controlled to 120° C., and casted so as to contact the drum for 20 seconds, thus obtaining undrawn sheet. Subsequently, it was preheated using a ceramic roll heated to 120° C., thus drawing in the machine direction of the sheet at a draw ratio of 2. Subsequently, the end part was gripped with a clip and introduced into a tenter drawing machine, and drawn at 150° C. at a draw ratio of 4, drawing speed of 50%/min. While applying 10% relaxation in the transverse direction, heat treatment was conducted at 140° C. for 7 seconds, thus obtaining a porous PP film with a thickness of 10 μm.

Preparation Example 2: Preparation of Porous Polyethylene(PE) Film

A porous PE film was obtained by the same method as Preparation Example 1, except that polyethylene(PE) resin (Toray Industries, Inc.) was used instead of polypropylene resin.

Preparation Example 3: Preparation of Porous Ethylene Vinyl Acetate (EVA) Film

EVA resin(LG Chem.) was fed to a single screw extruder (discharge rate 5 kg/hour) and melt extruded at 160° C. Foreign matter was removed using a leaf disc filter in which 5 pieces of sintered filters cut to 10 μm (filtration area: 65000 mm$^2$) were set, and then, the extruded resin was passed through a wire mesh screen filter (filtration area: 20000 mm$^2$) cut to 30 μm. Thereafter, it was discharged from a T die to a cast drum of which surface temperature was controlled to 120° C., and casted so as to contact the drum for 20 seconds, thus obtaining undrawn sheet. Subsequently, it was preheated using a ceramic roll heated to 100° C., thus drawing in the machine direction at a draw ratio of 2. Subsequently, the end part was gripped with a clip and introduced into a tenter drawing machine, and drawn at 120° C. at a draw ratio of 4, drawing speed of 20%/min. While applying 10% relaxation in the transverse direction, heat treatment was conducted at 100° C. for 7 seconds, thus obtaining a porous EVA film with a thickness of 10 μm.

Preparation Example 4: Preparation of Plasma Treated Porous Polypropylene(PP) Film On both sides of the porous PP film prepared in Preparation Example 1, plasma treatment was conducted using spottec equipment of Tentec Company, under the following conditions, thus preparing a plasma treated porous PP film.
Output frequency: 25 KHz
Output power: 300 Watt
Exposure distance: 10 mm
Exposure time: progressing for 90 seconds on each side Preparation Example 5: Preparation of Plasma Treated Porous Ethylene Vinyl Acetate (EVA) Film A plasma treated porous EVA film was prepared by progressing plasma treatment of the porous EVA prepared in Preparation Example 3, by the same method as Preparation Example 4

Experimental Example 1: Measurement of the Properties of Porous Polyolefin (PO) Film The properties of the porous polyolefin films of Preparation Examples 1, 2, 4 and 5 were measured as follows, and the results were shown in Table 1.

(1) Pore size: Pore size was measured using BELSORP-miniX equipment of SOLETEX Company, by $N_2$ adsorption.

(2) Porosity: The true density, thickness and mass of each PO film were measured, and porosity was calculated according to the following Equation 1.

Porosity (%)=(1−(measured density of porous polyolefin film protection layer/theoretical density of polyolefin))×100    [Equation 1]

(3) Air permeability: Air permeability was measured using Gurley air permeability tester, according to JIS P-8117. Wherein, a time for which 100 cc air passes through diameter of 28.6 mm and area of 645 me was measured.

(4) Contact angle: On the surface of each PO film, the liquid drops of an electrolyte prepared by dissolving LiFSI in a solvent mixture of polycarbonate (PC):dimethylcarbonate (DMC)=3:7 volume ratio at the concentration of 3.5 M were dropped, and left for 30 minutes, and then, contact angle was measured by a sessile drop method using a microscope.

TABLE 1

| | Thickness (μm) | Pore size (nm) | Porosity (%) | Air permeability (s/100 cc) | Contact angle |
|---|---|---|---|---|---|
| Preparation Example 1 | 10 | 41 | 53 | 120 | 87 |
| Preparation Example 2 | 10 | 43 | 50 | 135 | 81 |
| Preparation Example 4 | 10 | 35 | 40 | 150 | 7 |
| Preparation Example 5 | 10 | 37 | 35 | 201 | 0 |

Examples 1 to 2 and Comparative Examples 1 to 4

(1) Preparation of a Cathode

Li(Ni$_{0.6}$Mn$_{0.2}$Co$_{0.2}$)O$_2$ 96 g, PVDF 2 g, and carbon black 2 g were added to 150 ml of N-methylpyrrolidone to prepare a slurry, and then, the slurry was coated on an aluminum foil of a thickness of 15 μm, and dried at about 130° C. for 2 hours to prepare a cathode.

(2) Preparation of an Anode

On a copper foil of thickness of 15 μm, metal was deposited to a thickness of 5 μm to prepare a lithium metal electrode, and each protection layer of the following Table 2 was stacked thereon, thus preparing an anode. However, in Comparative Example 1, a lithium metal electrode prepared by depositing lithium metal on a copper foil was used as an anode without a separate protection layer.

TABLE 2

| | Protection layer |
|---|---|
| Example 1 | Preparation Example 4 |
| Example 2 | Preparation Example 5 |

TABLE 2-continued

| | Protection layer |
|---|---|
| Comparative Example 1 | No |
| Comparative Example 2 | BN/PVDF |
| Comparative Example 3 | Preparation Example 1 |
| Comparative Example 4 | Preparation Example 2 |

The BN/PVDF protection layer of Comparative Example 2 was prepared as follows.

500 ml of PVDF (Polyvinylidene fluoride) and NMP (N-methyl pyrrolidone) solution was mixed with 500 ml of BN (Boron Nitride) and NMP solution, thus preparing a BN/PVDF/NMP solution (a composition for forming a protection layer). Wherein, it was prepared such that the mass ratio of BN:PVDF of the composition for forming a protection layer became 9:1.

On the lithium metal electrode, the composition for forming a protection layer was applied using a doctor blade, and dried to form a protection layer with a thickness of 2 μm (BN 90 wt %, PVDF 10 wt %).

(3) Preparation of Electrolyte

In a solvent mixture of polycarbonate (PC):dimethylcarbonate (DMC)=3:7 volume ratio, LiFSI was dissolved at the concentration of 3.5 M to prepare an electrolyte.

(4) Preparation of a Lithium Secondary Battery

Between the cathode and anode, a ceramic coated polyolefin separator (Asahi kasei, ND307B15) of a thickness of 15 μm was interposed to prepare an electrode assembly of a structure in which cathode/separator/anode protection layer/anode are sequentially stacked, positioned inside of a battery case, and then, the electrolyte was injected to prepare a lithium secondary battery.

Experimental Example 2: Evaluation of Initial Discharge Capacity and Life Characteristic The initial discharge capacity and life characteristic of each battery prepared in Examples and Comparative Examples were evaluated. The battery was operated at 25° C. under the following conditions.

[Initial Discharge Capacity]

Charge: rate 0.1 C, voltage 4.25V, CC/CV (5% current cut at 1 C)

Discharge: rate 0.1 C, voltage 3V, CC

[Life Characteristic]

Charge: rate 0.3 C, voltage 4.25V, CC/CV (5% current cut at 1 C)

Discharge: rate 0.5 C, voltage 3V, CC

TABLE 3

| | Initial discharge capacity (mAh) | Number of cycles at discharge capacity retention rate of 80% |
|---|---|---|
| Example 1 | 125 | 92 |
| Example 2 | 126 | 110 |
| Comparative Example 1 | 128 | 30 |
| Comparative Example 2 | 126 | 54 |
| Comparative Example 3 | 122 | 82 |

TABLE 3-continued

|  | Initial discharge capacity (mAh) | Number of cycles at discharge capacity retention rate of 80% |
|---|---|---|
| Comparative Example 4 | 121 | 71 |

Referring to Table 3, it is confirmed that in case a porous polyolefin protection layer is introduced into an anode, remarkably improved life characteristic is exhibited compared to Comparative Example 1 without a protection layer and Comparative Example 2 in which a BN/PVDF protection layer is introduced. However, it is confirmed that a porous polyolefin protection layer without plasma treatment acts as resistance, thus lowering initial discharge capacity.

Experimental Example 3: Evaluation of Durability of Protection Layer

After charging the battery of Example 1 and the battery of Comparative Example 2 one time, the batteries were decomposed to confirm the conditions of the protection layers. The FIGURE shows photographs of the surfaces of the protection layers.

Referring to the FIGURE, it is confirmed that the surface of the protection layer of Example 1 is not damaged even after battery operation, while the surface of the protection layer of Comparative Example 2 is penetrated by lithium dendrite.

The invention claimed is:

1. A lithium secondary battery, comprising:
a cathode;
an anode;
a separator interposed between the cathode and anode; and
an electrolyte,
wherein the anode comprises a current collector, a protection layer, and optionally, a lithium metal layer interposed between the current collector and protection layer,
wherein the protection layer comprises a hydrophilically surface modified porous polyolefin film,
wherein the protection layer has a contact angle to an electrolyte prepared by dissolving LiFSI in a solvent mixture of polycarbonate and dimethylcarbonate in a volume ratio of 3:7 at the concentration of 3.5 M, of 40° or less,
wherein the electrolyte comprises an organic solvent and lithium salts, and
wherein the lithium salts are present at a concentration range of 2 M to 7 M.

2. The lithium secondary battery according to claim 1, wherein the protection layer is hydrophilically surface modified by plasma treatment.

3. The lithium secondary battery according to claim 1, wherein the porous polyolefin comprises a polymer of olefinic monomers, or a copolymer of olefinic monomers and polar monomers.

4. The lithium secondary battery according to claim 3, wherein the olefinic monomers are at least one selected from the group consisting of ethylene, propylene, 1-butene, 1,3-butadiene, 1-pentene, 4-methyl-1-pentene, 1-hexene, 1-heptene, 1-octene, 1-decene, 1-dodecene, 1-tetradecene, 1-hexadecene, 1-octadecene, and 1-eicosene.

5. The lithium secondary battery according to claim 3, wherein the polar monomers are at least one selected from the group consisting of unsaturated carboxylic acid and derivatives of unsaturated carboxylic acid; styrene derivatives; (meth)acrylamide and derivatives of (meth)acrylamide; acrylonitrile and derivatives of acrylonitrile; and C1-6 alkylvinylketone.

6. The lithium secondary battery according to claim 3, wherein the polar monomers are at least one selected from the group consisting of (meth)acrylic acid, vinyl acetate, methyl(meth)acrylate, ethyl(meth)acrylate, butyl(meth)acrylate, styrene, alpha-methyl styrene, acrylonitrile, and methylvinylketone.

7. The lithium secondary battery according to claim 1, wherein air permeability of the porous polyolefin film is 300 sec/100 cc or less.

8. The lithium secondary battery according to claim 1, wherein the protection layer has a thickness of 1 μm to 30 μm.

9. The lithium secondary battery according to claim 1, wherein the protection layer has a pore diameter of 10 nm to 1000 nm, and a porosity of 20% to 80%.

10. The lithium secondary battery according to claim 1, wherein the organic solvent comprises at least one of a carbonate-based solvent, an ether-based solvent, or a phosphate-based solvent.

11. The lithium secondary battery according to claim 1, wherein the lithium salt comprises at least one of $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$, lithium bis(fluorosulfonyl)imide, lithium bis(trifluoromethanesulfonyl)imide, lithium bis(perfluoroethylsulfonyl)imide, lithiuim (fluorosulfonyl)(nonafluorobutanesulfonyl)imide, or lithium (fluorosulfonyl)(trifluoromethanesulfonyl)imide.

12. The lithium secondary battery according to claim 1, wherein the cathode comprises at least one cathode active materials selected from the group consisting of lithium-manganese oxide, lithium-cobalt oxide, lithium-nickel oxide, lithium-nickel-manganese oxide, lithium-nickel-cobalt oxide, lithium-manganese-cobalt oxide, and lithium-nickel-manganese-cobalt oxide.

13. The lithium secondary battery according to claim 1, wherein the cathode comprises a nickel-cobalt-manganese cathode active material.

* * * * *